US009965096B2

(12) United States Patent
Jeon

(10) Patent No.: US 9,965,096 B2
(45) Date of Patent: May 8, 2018

(54) METHOD AND APPARATUS FOR PROCESSING INPUT USING TOUCH SCREEN

(71) Applicant: Samsung Electronics Co., Ltd., Gyeonggi-do (KR)

(72) Inventor: Sung-Won Jeon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/111,686

(22) PCT Filed: Dec. 23, 2014

(86) PCT No.: PCT/KR2014/012684
§ 371 (c)(1),
(2) Date: Jul. 14, 2016

(87) PCT Pub. No.: WO2015/108288
PCT Pub. Date: Jul. 23, 2015

(65) Prior Publication Data
US 2016/0334935 A1 Nov. 17, 2016

(30) Foreign Application Priority Data

Jan. 16, 2014 (KR) ........................ 10-2014-0005557

(51) Int. Cl.
*G06F 3/041* (2006.01)
*G06F 3/044* (2006.01)
(Continued)

(52) U.S. Cl.
CPC ............ *G06F 3/0418* (2013.01); *G06F 3/044* (2013.01); *G06F 3/045* (2013.01); *G06F 3/0416* (2013.01); *G06F 3/04886* (2013.01)

(58) Field of Classification Search
CPC ............... G06F 3/0416; G06F 3/04817; G06F 3/04886; G02F 1/13338;
(Continued)

(56) References Cited

U.S. PATENT DOCUMENTS 5,856,822 A * 1/1999 Du ...................... G06F 3/03547
345/157
8,717,331 B2 * 5/2014 Kremin ................. G06F 3/0418
345/174
(Continued)

FOREIGN PATENT DOCUMENTS

WO 2012/044062 A2 4/2012

OTHER PUBLICATIONS

European Search Report dated Jul. 26, 2017.

*Primary Examiner* — Joe H Cheng
(74) *Attorney, Agent, or Firm* — Cha & Reiter, LLC

(57) ABSTRACT

Various exemplary embodiments of the present disclosure relate to a method and apparatus for processing an input using a touch screen, and an operation method of an electronic device includes: determining whether a surrounding environment of a touch screen panel has changed from a first surrounding environment to a second surrounding environment or not; and, when the surrounding environment has changed to the second surrounding environment, changing a reference voltage of the touch screen panel from a first reference voltage to a second reference voltage. Other embodiments are possible.

17 Claims, 14 Drawing Sheets

(51) Int. Cl.
*G06F 3/045* (2006.01)
*G06F 3/0488* (2013.01)

(58) Field of Classification Search
CPC .... H03K 2217/94026; H04M 1/72583; H05K 5/0017; B32B 2457/202; B32B 2457/208
See application file for complete search history.

(56) References Cited

U.S. PATENT DOCUMENTS

| | | | |
|---|---|---|---|
| 2005/0104862 A1* | 5/2005 | Kaski | H03K 17/9502 345/173 |
| 2009/0146992 A1* | 6/2009 | Fukunaga | G02F 1/13338 345/214 |
| 2009/0174688 A1 | 7/2009 | Westerman | |
| 2009/0282352 A1 | 11/2009 | Solanki et al. | |
| 2010/0103095 A1* | 4/2010 | Yamamoto | G06F 3/0346 345/156 |
| 2011/0163768 A1* | 7/2011 | Kwon | G06F 3/044 324/686 |
| 2012/0262403 A1 | 10/2012 | Tissot | |
| 2012/0268411 A1 | 10/2012 | Chen et al. | |
| 2012/0274604 A1 | 11/2012 | Norton et al. | |
| 2012/0293447 A1* | 11/2012 | Heng | G06F 3/044 345/174 |
| 2012/0325723 A1 | 12/2012 | Carnevali | |
| 2013/0027861 A1 | 1/2013 | Rosenau et al. | |
| 2013/0093438 A1 | 4/2013 | Hosokawa et al. | |
| 2013/0099637 A1 | 4/2013 | Richardson et al. | |
| 2013/0141387 A1 | 6/2013 | Royhob | |
| 2013/0176268 A1 | 7/2013 | Li et al. | |
| 2014/0135076 A1* | 5/2014 | Lee | H04M 1/6041 455/569.1 |
| 2014/0160085 A1* | 6/2014 | Rabii | G06F 1/3262 345/178 |
| 2015/0009173 A1* | 1/2015 | Rodzevski | G06F 3/0414 345/174 |

\* cited by examiner

METHOD AND APPARATUS FOR PROCESSING INPUT USING TOUCH SCREEN

CLAIM OF PRIORITY

This application is a National Phase Entry of PCT International Application No. PCT/KR2014/012684, which was filed on Dec. 23, 2014, and claims a priority to Korean Patent Application No. 10-2014-0005557, which was filed on Jan. 16, 2014, the contents of which are incorporated herein by reference.

BACKGROUND ART

Various exemplary embodiments of the present disclosure relate to a method and apparatus for processing an input using a touch screen. Various types of electronic devices such as smart phones, tablet PCs, etc. may include a touch screen panel (TSP). For example, the TSP may be classified into a resistive type TSP and a capacitive type TSP.

For example, the capacitive type touch screen panel is a touch screen panel which detects a touch using static electricity generated in a human body, and is widely used in various types of electronic devices such as smart phone, tablet PCs, etc. Hereinafter, the capacitive type touch screen will be referred to as a touch screen. For example, when the touch screen panel is operated under water, the entire area of the touch screen panel is fully touched due to the conductivity of water. Therefore, there is an error that a touch cannot be detected even when a user touches the touch screen panel.

DETAILED DESCRIPTION OF THE INVENTION

Technical Objects

Various exemplary embodiments of the present disclosure provide a underwater processing method of an electronic device, which can exactly determine whether various types of electronic devices, such as smart phones, tablet PCs, etc. are in an underwater state or not when they are operated under water, and switch to an underwater mode in which a user's touch can be normally detected even under water, so that an operation can be processed as desired by a user, and an electronic device thereof.

According to an exemplary embodiment of the present disclosure, an operation method of an electronic device includes: determining whether a surrounding environment of a touch screen panel has changed from a first surrounding environment to a second surrounding environment or not; and, when the surrounding environment has changed to the second surrounding environment, changing a reference voltage of the touch screen panel from a first reference voltage to a second reference voltage.

According to an exemplary embodiment of the present disclosure, an electronic device includes: a touch screen panel; and a processor configured to control the touch screen panel, wherein the processor is configured to determine whether a surrounding environment of the touch screen panel has changed from a first surrounding environment to a second surrounding environment or not, and, when the surrounding environment has changed to the second surrounding environment, change a reference voltage of the touch screen panel from a first reference voltage to a second reference voltage.

BEST MODE FOR EMBODYING THE INVENTION

Figure 1A:
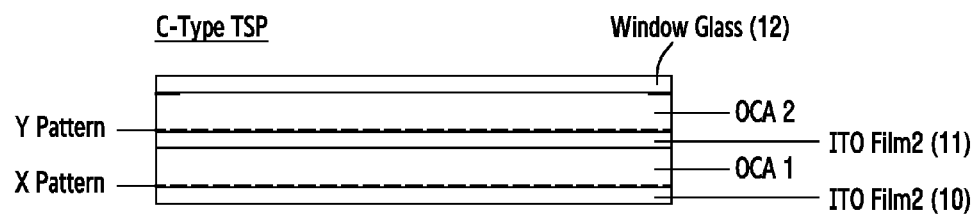
FIGS. 1A and 1B illustrates a view showing a layered structure of a touch screen panel.
Figure 1B:
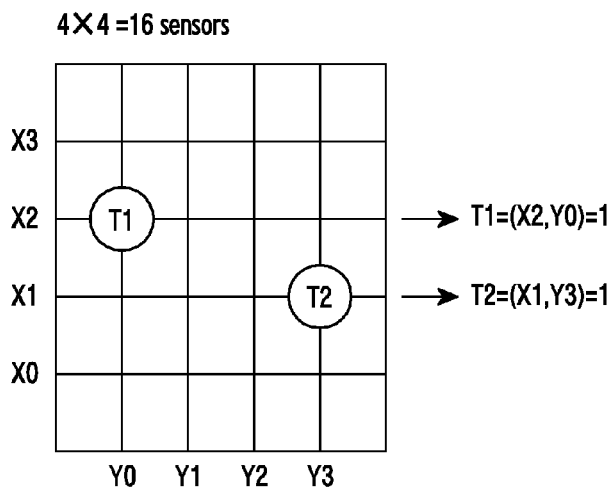

FIGS. 1A and 1B illustrates a view showing an example of a structure of a touch screen panel. For example, as shown in FIG. 1A, the touch screen panel may have a layered structure in which a first indium tin oxide (ITO) film 10, a first optical clear adhesive (OCA1), a second ITO film 11, a second OCA (OCA2), window glass 12, etc. are stacked one on another. The first OCA (OCA1) for bonding the first ITO film 10 and the second ITO film 11, and the second OCA (OCA2) for bonding the second ITO film 11 and the window glass 12 may be transparent double-sided tapes.

The first ITO film 10 and the second ITO film 11 may be compounds of indium and tin oxide and may be thin films for making a transparent electrode. A transmitter for transmitting a pulse signal for detecting a touch signal may be formed on a contact surface of the first ITO film 10 contacting the first OCA (OCA1) in an X-pattern of a horizontal direction, for example. A receiver for receiving the pulse signal may be formed on a contact surface of the second ITO film 11 contacting the second OCA (OCA2) in a Y-pattern of a vertical direction. For example, as shown in FIG. 1B, when a user touches a T1 location with user's finger, a touch screen panel of 4×4 sensors may detect a value of coordinates (X2, Y0) corresponding to the T1 location as 1, and, when the user touches a T2 location, the touch screen panel may detect a value of coordinates (X1, Y3) corresponding to the T2 location as 1.

Figure 2A:
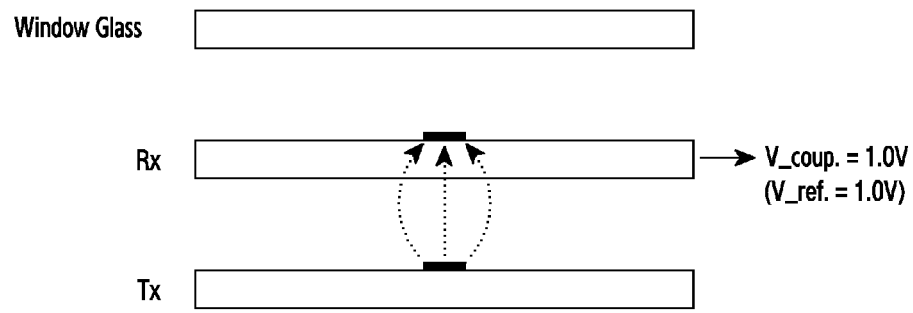
FIGS. 2A and 2B illustrates a view showing a touch state of a touch screen panel.
Figure 2B:
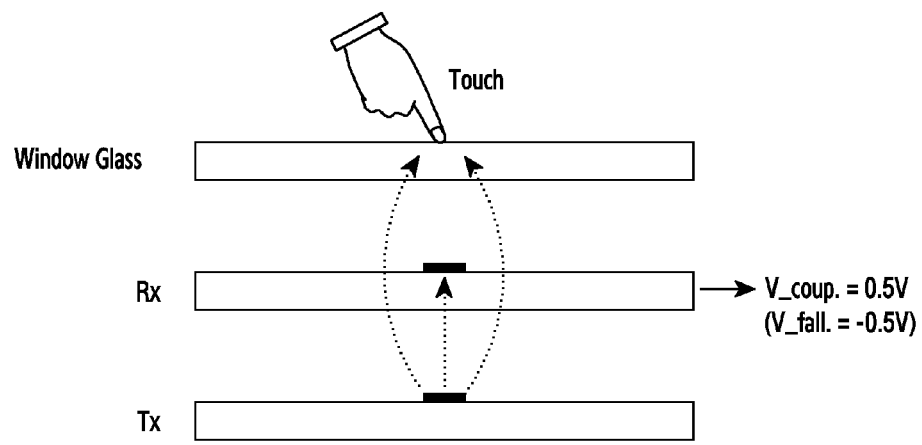
Figure 3:
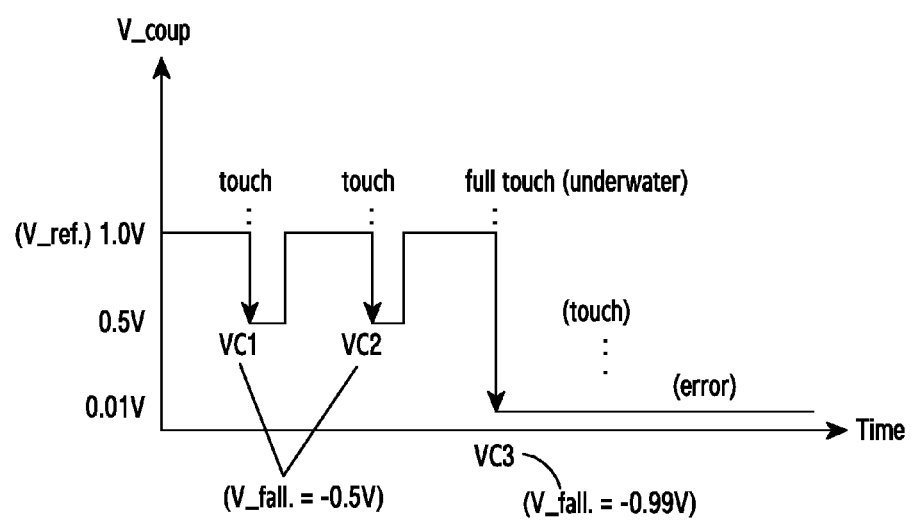
FIG. 3 illustrates a graph regarding a falling coupling voltage of a touch screen panel.

FIGS. 2A and 2B illustrates a view showing an example of a touch state of a touch screen panel, and FIG. 3 illustrates a graph showing a change in a coupling voltage of the touch screen panel. The coupling voltage refers to a voltage which is generated in the receiver by the pulse signal transmitted from the transmitter. For example, when there is no user touch as shown in FIG. 2A, as many pulse signals as a first degree (for example: all) transmitted from the transmitter of the X pattern may be received by the receiver of the Y pattern. Based on this, a first coupling voltage (for example: V_coup.=about 1.0V) between the transmitter of the transmitting side (Tx) and the receiver of the receiving side (Rx) may be detected as a designated (for example: a predetermined) first reference voltage (for example: V_ref.=about 1.0V). For example, when there is a user touch as shown in FIG. 2B, some of the pulse signals transmitted from the transmitter of the X pattern are induced by the touch input (for example: a touched user's finger or electronic pen), and thus as many pulse signals as a second degree (for example: the other signals) may be received by the receiver of the Y pattern. In this case, the first degree may be greater than the second degree. In this regard, a second coupling voltage (for example: V_coup.=about 0.5V) between the transmitter of the transmitting side (Tx) and the receiver of the receiving side (Rx) may be detected as a voltage lower than the first reference voltage (for example: V_ref.=about 1.0V).

The coupling voltage decreasing from the reference voltage may be called various names such as a falling coupling voltage (V_fall.). For example, as shown in FIG. 3, the touch screen panel may detect a touch input by detecting a falling coupling voltage VC1, VC2 (for example: V_fall.=about −0.5V) which fall below the designated first reference voltage (for example: V_ref=about 1.0V).

For example, when the touch screen panel is operated under water, the entire area of the touch screen panel may be fully touched due to the conductivity of water. In this regard, the third coupling voltage VC3 may be close to zero (for example: VC3=about 0.01V) as shown in FIG. 3, and the absolute value of the falling coupling voltage (for example: V_fall.=−0.99V) may be the same as or substantially equal to the first reference voltage (for example: V_ref=about 1.0V). Accordingly, when the touch screen panel is operated under water and a user input, for example, a touch or hovering occurs, it is recognized that the entire touch screen has been already touched and thus the touch screen panel may not perform an operation corresponding to the user input.

Various exemplary embodiments of the present disclosure will be described herein below with reference to the accompanying drawings. Although specific embodiments of the present disclosure are illustrated in the drawings and described in the detailed descriptions, various changes can be made and various embodiments can be provided. However, the various exemplary embodiments of the present disclosure are not limited to the specific embodiments and should be construed as including all modification and/or equivalent or alternative included in the idea and the technical scope of the present disclosure. In the explanation of the drawings, similar reference numerals are used for similar elements.

The terms "include" or "may include" used in the exemplary embodiments of the present disclosure indicate the presence of disclosed corresponding functions, operations, elements, and the like, and do not limit additional one or more functions, operations, elements, and the like. In addition, it should be understood that the terms "include" or "has" used in the exemplary embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The term "or" used in the various exemplary embodiments of the present disclosure includes any and all combinations of words enumerated with it. For example, "A or B" means including A, including B, or including both A and B. Although the terms such as "first" and "second" used in the various exemplary embodiments of the present disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of the various exemplary embodiments of the present invention, and similarly, a second element may be named a first element.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

The terms used in the various exemplary embodiments of the present disclosure are for the purpose of describing specific exemplary embodiments only and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various exemplary embodiments of the present disclosure may be a device which is equipped with a communication function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical device, a camera, or a wearable device (for example: a head-mounted-device (HMD) such as electronic glasses, electronic clothing, an electronic bracelet, an electronic necklace, an electronic appccessory, electronic tattoos, or a smartwatch).

According to an exemplary embodiment, the electronic device may be a smart home appliance which is equipped with a communication function. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), game consoles, an electronic dictionary, an electronic key, a camcorder, or an electronic album.

According to an exemplary embodiment, the electronic device may include at least one of various medical devices (for example: Magnetic Resonance Angiography (MRA), Magnetic Resonance Imaging (MRI), Computed Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example: a navigation equipment for ship, a gyro compass, and the like), avionics, a security device, a head unit for vehicles, an industrial or home robot, an automatic teller's machine (ATM) of a financial institution, or a Point of Sales (POS) of a store.

According to an exemplary embodiment, the electronic device may include at least one of a part of furniture or a building/a structure equipped with a communication function, an electronic board, an electronic signature receiving device, a projector, and various measurement devices (for example: devices for measuring water, power, gas, radio waves, and the like). The electronic device according to various exemplary embodiment of the present disclosure may be one or a combination of one or more of the above-mentioned devices. In addition, the electronic device according to various exemplary embodiments of the present disclosure may be a flexible device. In addition, it is obvious to an ordinary skilled person in the related art that the electronic device according to various exemplary embodiments of the present disclosure is not limited to the above-mentioned devices.

Hereinafter, an electronic device according to various exemplary embodiments will be explained with reference to the accompanying drawings. The term "user" used in various exemplary embodiments may refer to a person who uses the electronic device or a device that uses the electronic device (for example, an artificial intelligence electronic device).

Figure 4:
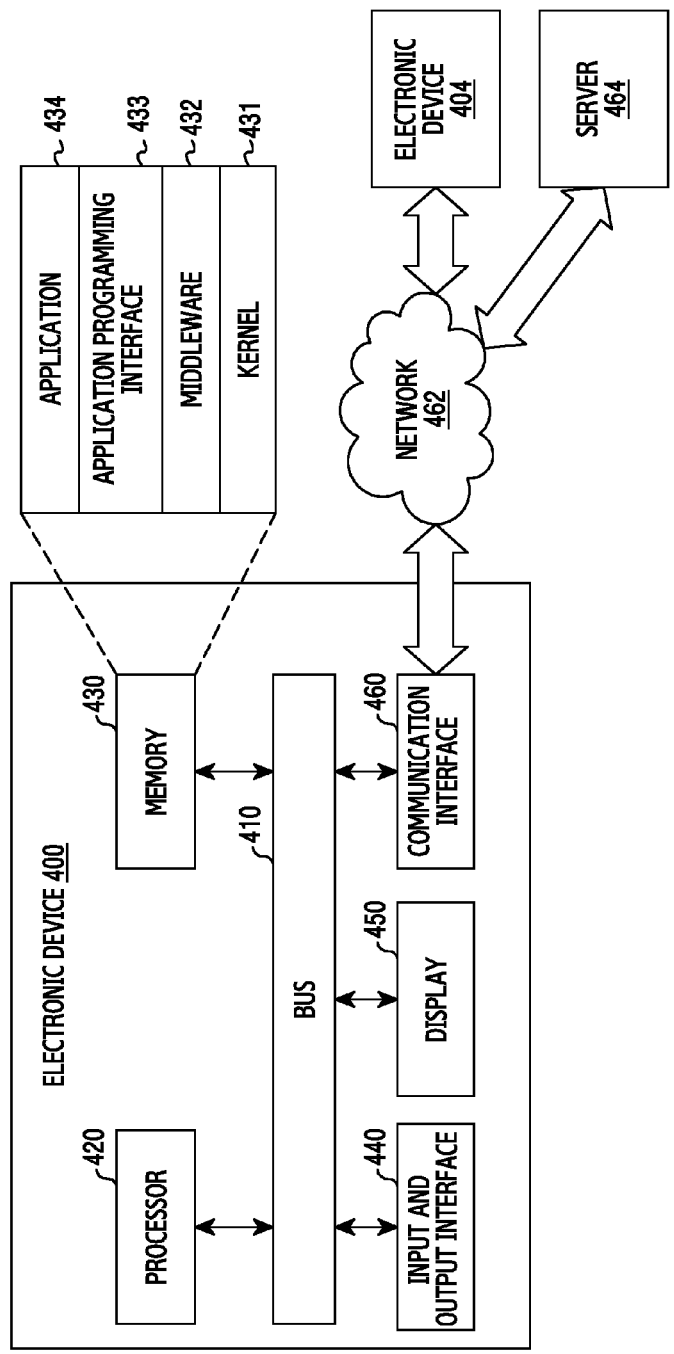
FIG. 4 illustrates a block diagram of an electronic device according to various exemplary embodiments of the present disclosure.

FIG. 4 illustrates a view showing a network environment including an electronic device 400 according to various exemplary embodiments. Referring to FIG. 4, the electronic device 400 may include a bus 410, a processor 420, a memory 430, an input and output interface 440, a display 450, and a communication interface 460. The bus 410 may be a circuit which connects the above-described elements with one another and transmits communication (for example: a control message) between the above-described elements. The bus 110 may be a circuit which connects the above-described elements with one another and transmits communication (for example: a control message) between the above-described elements.

The processor 420 may receive instructions from the other elements (for example: the memory 430, the input and output interface 440, the display 450, the communication interface 460, and the like) via the bus 410, decipher the instructions, and perform calculation or data processing according to the deciphered instructions. The memory 430 may store instructions or data which is received from or generated by the processor 420 or the other elements (for example: the input and output interface 440, the display 450, the communication interface 460, and the like). For example, the memory 430 may include programming modules such as a kernel 431, middleware 432, an Application Programming Interface (API) 433, an application 434, and the like. Each of the above-described programming modules may be configured by software, firmware, hardware, or a combination of two or more of them.

The kernel 431 may control or manage system resources (for example: the bus 410, the processor 420, the memory 430, and the like) which are used for performing operations or functions implemented in the middleware 432, the API 433, or the application 434. In addition, the kernel 431 may provide an interface for allowing the middleware 432, the API 433, or the application 434 to access an individual element of the electronic device 400 and control or manage the element.

The middleware 432 may serve as an intermediary to allow the API 433 or the application 434 to communicate with the kernel 431 and exchange data with the kernel 431. In addition, the middleware 432 may perform controlling (for example: scheduling or load balancing) with respect to work requests received from the application 434, for example, by giving priority to use the system resources of the electronic device 400 (for example: the bus 410, the processor 420, the memory 430, and the like) to at least one of the applications 434.

The API 433 is an interface for allowing the application 434 to control a function provided by the kernel 431 or the middleware 432, and, for example, may include at least one interface or function (for example: instructions) for controlling a file, controlling a window, processing an image, or controlling a text. According to various exemplary embodiments, the application 434 may include a Short Message Service (SMS)/Multimedia Messaging Service (MMS) application, an email application, a calendar application, a notification application, a health care application (for example: an application for measuring exercise or blood sugar), an environment information application (for example: an application for providing information on atmospheric pressure, humidity, or temperature), and the like.

Additionally or alternatively, the application 434 may be an application related to information exchange between the electronic device 400 and an external electronic device (for example: an electronic device 404). For example, the application related to the information exchange may include a notification relay application for relaying specific information to the external electronic device or a device management application for managing the external electronic device.

For example, the notification relay application may include a function of relaying notification information generated by other applications of the electronic device 400 (for example: the SMS/MMS application, the email application, the health care application, the environment information application, and the like) to an external electronic device (for example: the electronic device 404). Additionally or alternatively, the notification relay application may receive notification information from the external electronic device (for example: the electronic device 404) and may relay the same to the user. For example, the device management application may manage (for example: install, delete or update) a function regarding at least part of the external electronic device (for example: the electronic device 404) communicating with the electronic device 400 (for example: turning on/off the external electronic device (or some parts) or adjusting brightness (or resolution) of a display), an application operating in the external electronic device or a service provided by the external electronic device (for example: a calling service or a message service).

According to various exemplary embodiments, the application 434 may include an application specified according to an attribute (for example: a kind of an electronic device) of the external electronic device (for example: the electronic device 404). For example, when the external electronic device is an MP3 player, the application 434 may include an application related to music replay. Similarly, when the external electronic device is a mobile medical device, the application 434 may include an application related to health care. According to an exemplary embodiment, the application 434 may include at least one of an application specified by the electronic device 400 or an application received from the external electronic device (for example: a server 406 or the electronic device 404).

The input and output interface 440 may transmit instructions or data input by the user through an input and output device (for example: a sensor, a keyboard, or a touch screen) to the processor 420, the memory 430, or the communication interface 460 through the bus 410, for example. For example, the input and output interface 440 may provide data on a user's touch input through a touch screen to the processor 420. In addition, the input and output interface 440 may output instructions or data received from the processor 420, the memory 430, or the communication interface 460 through the bus 410 through an input and output device (for example: a speaker or a display). For example, the input and output interface 440 may output voice data processed by the processor 420 to the user through a speaker.

The display 450 may display a variety of information (for example: multimedia data, text data, and the like) for the user. The communication interface 460 may establish communication between the electronic device 400 and an external device (for example: the electronic device 404 or the server 406). For example, the communication interface 460 is connected to a network 462 via wireless communication or wire communication to communicate with the external device. The wireless communication may include at least one of Wireless Fidelity (WiFi), Bluetooth (BT), Near Field Communication (NFC), Global Positioning System (GPS), or cellular communication (for example: LTE, LTE-A, CDMA, WCDMA, UMTS, WiBro, GSM, and the like). The wire communication may include at least one of a Universal Serial Bus (USB), a High Definition Multimedia Interface (HDMI), a Recommended Standard 232 (RS-232), or a Plain Old Telephone Service (POTS).

According to an exemplary embodiment, the network 462 may be a telecommunications network. The telecommunications network may include at least one of a computer network, the Internet, Internet of things, or a telephone network. According to an exemplary embodiment, a protocol for communicating between the electronic device 400 and the external device (for example: a transport layer protocol, data link layer protocol or a physical layer protocol) may be supported in at least one of the application 434, the application programming interface 433, the middleware 432, the kernel 431, or the communication interface 460.

Figure 5:
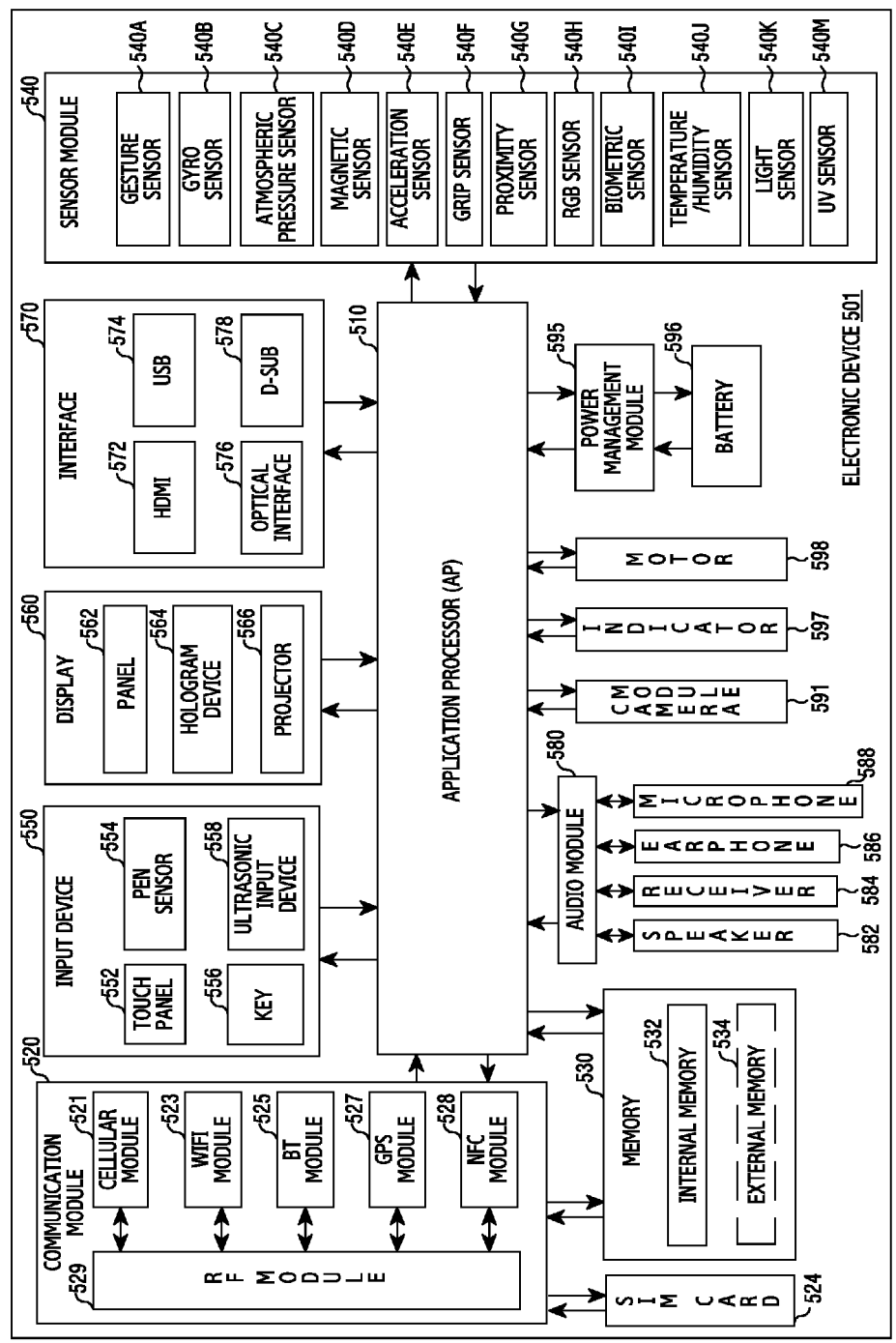
FIG. 5 illustrates a block diagram of hardware according to various exemplary embodiments of the present disclosure.

FIG. 5 illustrates a block diagram of an electronic device 501 according to various exemplary embodiments. The electronic device 501 may configure an entirety or part of the electronic device 400 shown in FIG. 4. Referring to FIG. 5, the electronic device 501 may include one or more Application Processors (APs) 510, a communication module 520, a Subscriber Identification Module (SIM) card 524, a memory 530, a sensor module 540, an input device 550, a display 560, an interface 570, an audio module 580, a camera module 591, a power management module 595, a battery 596, an indicator 597, or a motor 598.

The AP 510 may control a plurality of hardware or software elements connected to the AP 510 by driving an operating system or an application program, and may process and calculate a variety of data including multimedia data. For example, the AP 510 may be implemented by using a System on Chip (SoC). According to an exemplary embodiment, the AP 510 may further include a Graphics Processing Unit (GPU) (not shown).

The communication module 520 (for example: the communication interface 460) may transmit and receive data in communication between the electronic device 501 (for example: the electronic device 400) and other electronic devices (for example: the electronic device 404 or the sever 406) connected through a network. According to an exemplary embodiment, the communication module 520 may include a cellular module 521, a WiFi module 523, a BT module 525, a GPS module 527, an NFC module 528, and a Radio Frequency (RF) module 529.

The cellular module 521 may provide a voice call, a video call, a text service, or an Internet service through a telecommunications network (for example: LTE, LTE-A, CDMA, WCDMA, UMTS, WiBro, GSM, and the like). In addition, the cellular module 521 may identify and authenticate the electronic device in the telecommunications network by using a subscriber identification module (for example: the SIM card 524). According to an exemplary embodiment, the cellular module 521 may perform at least some of functions provided by the AP 510. For example, the cellular module 521 may perform at least some of multimedia control functions.

According to an exemplary embodiment, the cellular module 521 may include a Communication Processor (CP). In addition, the cellular module 521 may be implemented by using a SoC, for example. In FIG. 5, the cellular module 521 (for example: the communication processor), the memory 530, or the power management module 595 are elements separate from the AP 510. However, according to an exemplary embodiment, the AP 510 may be configured to include at least some of the above-described elements (for example: the cellular module 521).

According to an exemplary embodiment, the AP 510 or the cellular module 521 (for example: the communication processor) may load instructions or data received from a non-volatile memory connected therewith or at least one of the other elements into a volatile memory, and may process the instructions or data. In addition, the AP 510 or the cellular module 521 may store data which is received from at least one of the other elements or generated by at least one of the other elements in the non-volatile memory.

The WiFi module 523, the BT module 525, the GPS module 527, or the NFC module 528 each may include a processor for processing data received and transmitted through a corresponding module. In FIG. 5, the cellular module 521, the WiFi module 523, the BT module 525, the GPS module 527, or the NFC module 528 is illustrated in a separate block. However, according to an exemplary embodiment, at least some (for example: two or more) of the cellular module 521, the WiFi module 523, the BT module 525, the GPS module 527, or the NFC module 528 may be included in a single integrated chip (IC) or a single IC package. For example, at least some of the processors corresponding to the cellular module 521, the WiFi module 523, the BT module 525, the GPS module 527, and the NFC module 528 (for example: the communication processor corresponding to the cellular module 521 and the WiFi processor corresponding to the WiFi module 523) may be implemented by using a single SoC.

The RF module 529 may transmit and receive data, for example, may transmit and receive an RF signal. Although not shown, the RF module 529 may include a transceiver, a Power Amp Module (PAM), a frequency filter, or a Low Noise Amplifier (LNA), for example. In addition, the RF module 529 may further include a part for exchanging electromagnetic waves in a free space in wireless communication, for example, a conductor or conducting wire. In FIG. 5, the cellular module 521, the WiFi module 523, the BT module 525, the GPS module 527, and the NFC module 528 share the single RF module 529 with one another. However, according to an exemplary embodiment, at least one of the cellular module 521, the WiFi module 523, the BT module 525, the GPS module 527, or the NFC module 528 may transmit and receive an RF signal through a separate RF module.

The SIM card 524 may be a card including a subscriber identification module, and may be inserted into a slot formed on a specific location of the electronic device. The SIM card 524 may include unique identification information (for example, an Integrated Circuit Card Identifier (ICCID)) or subscriber information (for example, International Mobile Subscriber Identity (IMSI)).

The memory 530 (for example: the memory 430) may include an internal memory 532 or an external memory 534. For example, the internal memory 532 may include at least one of a volatile memory (for example, a Dynamic Random Access Memory (DRAM), a Static Random Access Memory (SRAM), a Synchronous DRAM (SDRAM), and the like) or a non-volatile memory (for example, an One-Time Programmable Read Only Memory (OTPROM), a Programmable Read Only Memory (PROM), an Erasable and Programmable Read Only Memory (EPROM), an Electrically Erasable and Programmable Read Only Memory (EEPROM), a mask ROM, a flash ROM, a NAND flash memory, a NOR flash memory, and the like).

According to an exemplary embodiment, the internal memory 532 may be a Solid State Drive (SSD). The external memory 534 may further include a flash drive, for example, Compact Flash (CF), Secure Digital (SD), Micro-SD, Mini-SD, extreme-Digital (xD), memory stick, and the like. The external memory 534 may be functionally connected with the electronic device 501 through various interfaces. According to an exemplary embodiment, the electronic device 501 may further include a storage device (or a storage medium) such as a hard drive.

The sensor module 540 may measure a physical quantity or detect an operation state of the electronic device 501, and may convert measured or sensed information into electric signals. The sensor module 540 may include at least one of a gesture sensor 540A, a gyro sensor 540B, a barometric pressure sensor 540C, a magnetic sensor 540D, an acceleration sensor 540E, a grip sensor 540F, a proximity sensor 540G a color sensor 540H (for example: Red, Green, Blue (RGB) sensor), a biosensor 540I, a temperature/humidity sensor 540J, an illumination sensor 540K, and a Ultraviolet (UV) sensor 540M. Additionally or alternatively, the sensor module 540 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor, and the like. The sensor module 540 may further include a control circuit to control at least one sensor included therein.

The input device 550 may include a touch panel 552, a (digital) pen sensor 554, a key 556, or an ultrasonic input device 558. The touch panel 552 may recognize a touch input in at least one method of capacitive, resistive, infrared, and ultrasonic methods. In addition, the touch panel 552 may further include a control circuit (not shown). In the case of a capacitive method, the touch panel 552 may recognize physical contact or approach. The touch panel 552 may further include a tactile layer. In this case, the touch panel 552 may provide a tactile response to the user.

The (digital) pen sensor 554 may be implemented in the same or similar method as or to the method of receiving a user's touch input or by using a separate recognition sheet. The key 556 may include a physical button, an optical key, or a keypad, for example. The ultrasonic input device 558 allows the electronic device 501 to detect sound waves through a microphone (for example: the microphone 588) and identify data through an input device generating ultrasonic signals, and is capable of wireless recognition. According to an exemplary embodiment, the electronic device 501 may receive a user input from an external device connected thereto (for example: a computer, or a server) by using the communication module 520.

The display 560 (for example: the display 450) may include a panel 562, a hologram device 564, or a projector 566. For example, the panel 562 may be a Liquid Crystal Display (LCD) or an Active Matrix Organic Light Emitting Diode (AM-OLED). For example, the panel 562 may be implemented to be flexible, transparent, or wearable. The panel 562 may be configured as a single module along with the touch panel 552. The hologram device 564 may show a stereoscopic image in the air using interference of light. The projector 566 may display an image by projecting light onto a screen. The screen may be located inside or outside the electronic device 501. According to an exemplary embodiment, the display 560 may further include a control circuit to control the panel 562, the hologram device 564, or the projector 566.

The interface 570 may include a High Definition Multimedia Interface (HDMI) 572, a Universal Serial Bus (USB) 574, an optical interface 576, or D-subminiature (sub) 578. The interface 570 may be included in the communication interface 460 shown in FIG. 4. Additionally or alternatively, the interface 570 may include a Mobile High Definition Link (MHL) interface, a Secure Digital (SD) card/Multimedia Card (MMC) interface or Infrared Data Association (IrDA) standard interface (not shown).

The audio module 580 may convert a sound and an electric signal bidirectionally. For example, at least some elements of the audio module 580 may be included in the input and output interface 440 shown in FIG. 4. The audio module 580 may process sound information which is input or output through a speaker 582, a receiver 584, an earphone 586, or a microphone 588.

The camera module 591 is a device for photographing a still image and a moving image, and may include one or more image sensors (for example: a front surface sensor or a rear surface sensor), a lens (not shown), an Image Signal Processor (ISP) (not shown), or a flash (memory) (for example: a Light Emitting Diode (LED) or a xenon lamp). The power management module 595 may manage power of the electronic device 501. Although not shown, the power management module 595 may include a Power Management IC (PMIC), a charger IC, or a battery or fuel gage.

For example, the PMIC may be mounted in an integrated circuit or a SoC semiconductor. The charging method may be divided into a wired charging method and a wireless charging method. The charger IC may charge a battery and may prevent inflow of overvoltage or over current from a charger. According to an exemplary embodiment, the charger IC may include a charger IC for at least one of the wired charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 596, a voltage, a current, or temperature during charging. The battery 596 may store or generate electricity and may supply power to the electronic device 501 by using stored or generated electricity. The battery 596 may include a rechargeable battery or a solar battery.

The indicator 597 may display a specific state of the electronic device 501 or a part of it (for example: the AP 510), for example, a booting state, a message state, or a charging state. The motor 598 may convert an electric signal into a mechanical vibration. Although not shown, the electronic device 501 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device according to various exemplary embodiments of the present disclosure may be comprised of one or more components, and the names of the elements may vary according to the kind of the electronic device. The electronic device according to various exemplary embodiments of the present disclosure may include at least one of the above-described elements, and some of the elements may be omitted or an additional element may be further included. In addition, some of the elements of the electronic device according to various exemplary embodiments of the present disclosure may be combined into a single entity, and may perform the same functions as those of the elements before being combined.

According to various exemplary embodiments of the present disclosure, the electronic device includes a touch screen panel; and a processor for controlling the touch screen panel, and the processor may determine whether a surrounding environment of the touch screen panel has changed from a first surrounding environment to a second surrounding environment or not, and, when the surrounding environment has changed to the second surrounding environment, change a reference voltage of the touch screen panel from a first reference voltage to a second reference voltage.

According to an exemplary embodiment of the present disclosure, the electronic device 501 may be various types of electronic devices which can be used under water, such as waterproof smart phones or waterproof tablet PCs. The display module 560 may include a touch screen panel (TSP). The touch screen panel may use a touch screen panel which detects a touch using static electricity generated in a human body, for example. The processor 510 may detect a voltage (for example: a coupling voltage (V_coup.)) between a transmitter of a transmitting side (Tx) and a receiver of a receiving side (Rx) in the touch screen panel, and determine an input (for example: a touch input or a hovering input) through a touch screen. According to an exemplary embodiment, the input may include at least one of a long press, a touch, a swipe, a drag, or a pen input.

According to an exemplary embodiment of the present disclosure, the electronic device (for example: the processor 510) may detect a change in a surrounding environment (for example: a degree of conductivity of a surrounding environment for the touch screen) for the electronic device (for example: the touch screen). In addition, the electronic device may determine a driving mode of the touch screen (for example: select (or change) a reference voltage for detecting an input which is inputted through the touch screen) based on the change in the surrounding environment. For example, when the conductivity of the surrounding environment for the touch screen does not influence the detection of an input to the touch screen (for example: a case in which the electronic device is located in the air or an environment which has the same or similar conductivity as or to conductivity in the air), the electronic device may set a reference voltage for detecting an input to a touch screen to a first voltage (for example: V_ref.=about 1.0V).

On the other hand, when the conductivity of the surrounding environment for the touch screen influences the detection of an input to the touch screen (for example: a case in which the electronic device is located under water or an environment which has the same or similar conductivity as or to conductivity of water), the electronic device may select a second voltage (for example: V_ref.=about 0.01V) as a reference voltage for detecting an input to the touch screen. The first voltage may be greater than the second voltage according to the conductivity of the touch screen, for example.

According to an exemplary embodiment of the present disclosure, to detect a change in the surrounding environment of the touch screen, the electronic device (for example: the processor 510) may use a change in a touch input (for example: an input which is inputted through the entire area of the touch screen) through a designated area of the touch screen (for example: a predetermined area (the entire area of the touch screen)) during a designated time (for example: a predetermined time). For example, when an input (for example: a user input) is generated through the touch screen, the touch screen may detect a coupling voltage of an area corresponding to the touched area. When a change in the coupling voltage is detected through the entire area of the touch screen during a designated time, the electronic device may determine that the conductivity of the surrounding environment of the touch screen has changed.

Figure 6:
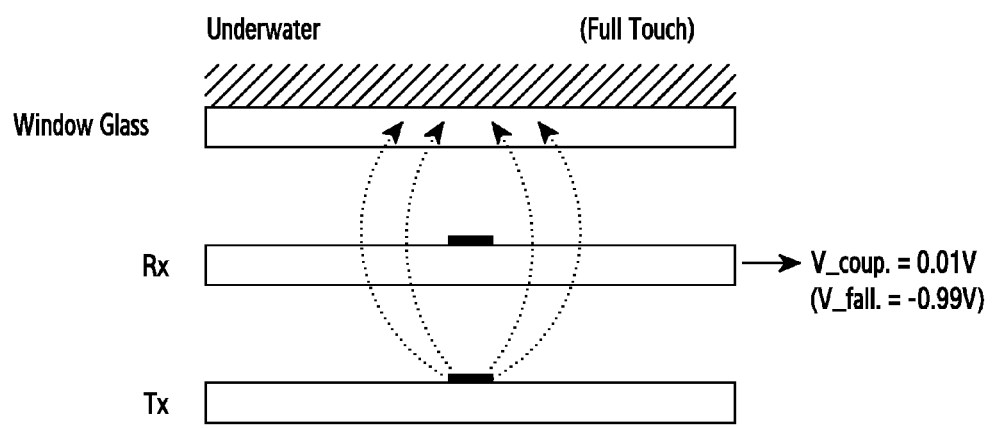
FIG. 6 illustrates a view showing an underwater state of a touch screen panel according to various exemplary embodiments of the present disclosure.
Figure 7:
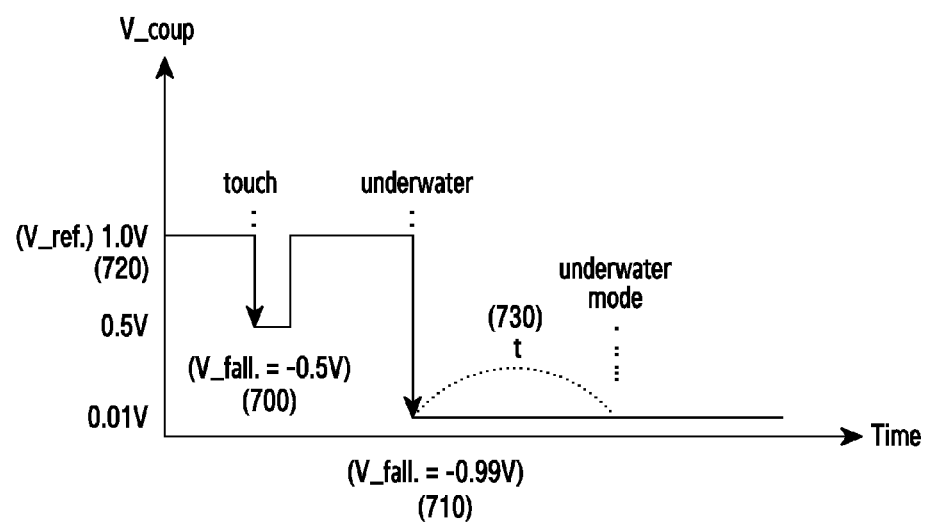
FIG. 7 illustrates a graph regarding a falling coupling voltage of a touch screen panel according to various exemplary embodiments of the present disclosure.

FIG. 6 illustrates a view showing a state of the touch screen panel according to a surrounding environment associated with the electronic device according to various exemplary embodiments of the present disclosure, and FIG. 7 illustrates a graph showing a change in a coupling voltage according to a change in an environment of the touch screen panel according to various exemplary embodiments of the present disclosure.

As shown in FIG. 6, when the conductivity of the touch screen influences the detection of an input to the touch screen due to the surrounding environment of the touch screen, the touch screen panel is in the state in which an input has been inputted to a first area (for example: an entire area) of the touch screen panel through the touch screen. In this regard, the coupling voltage (V_coup.) may be close to zero (for example: V_coup.=about 0.01V). When the absolute value of the falling voltage (for example: V_fall.=about −0.99V) detected on the first area of the touch screen panel is the same as or substantially equal to the reference voltage (for example: V_ref.=about 1.0V), and also is maintained by more than a designated value (for example: a predetermined time t=two seconds, a moving distance, etc.), the processor 510 may determine that the electronic device is in an underwater state. In this regard, the electronic device may switch the driving mode of the touch screen to an underwater mode.

As shown in FIG. 7, the processor 510 may detect a falling voltage (for example: V_fall.=about −0.5V) 700 of the touch screen panel. Accordingly, the processor 510 may determine whether an input is inputted through the touch screen or not and perform an operation corresponding to the input. For example, the processor 510 determines that the absolute value of the falling voltage (for example: V_fall.=about −0.99V) 710 is the same as or substantially equal to a designated reference voltage (for example: V_ref.=about 1.0V) 720. In this regard, when the falling voltage is maintained on the entire area of the touch screen panel by more than a designated value (for example: time t=2 seconds) 730, the processor 510 may determine that the surrounding environment of the electronic device has changed to the underwater state.

Figure 8:
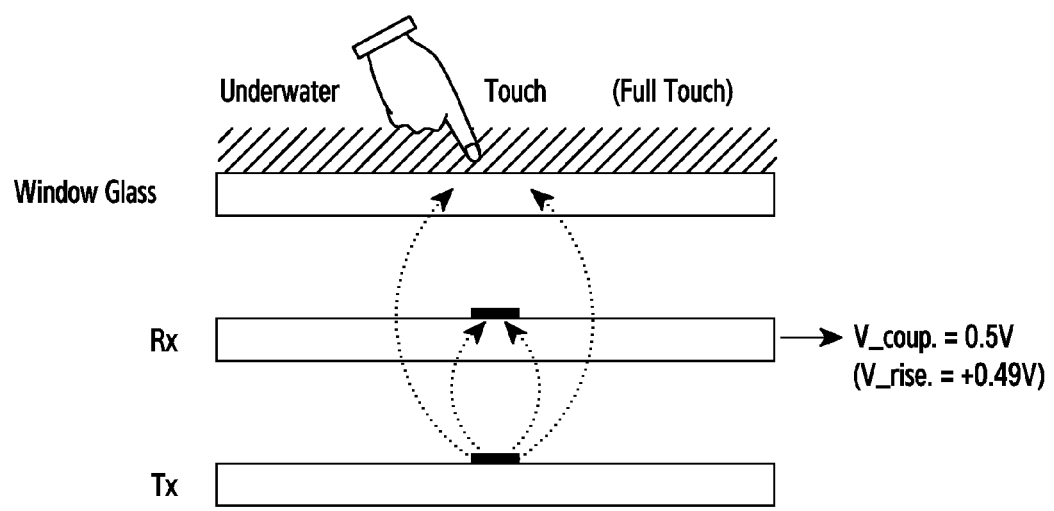
FIG. 8 illustrates a touch state of a touch screen panel according to various exemplary embodiments of the present disclosure.
Figure 9A:
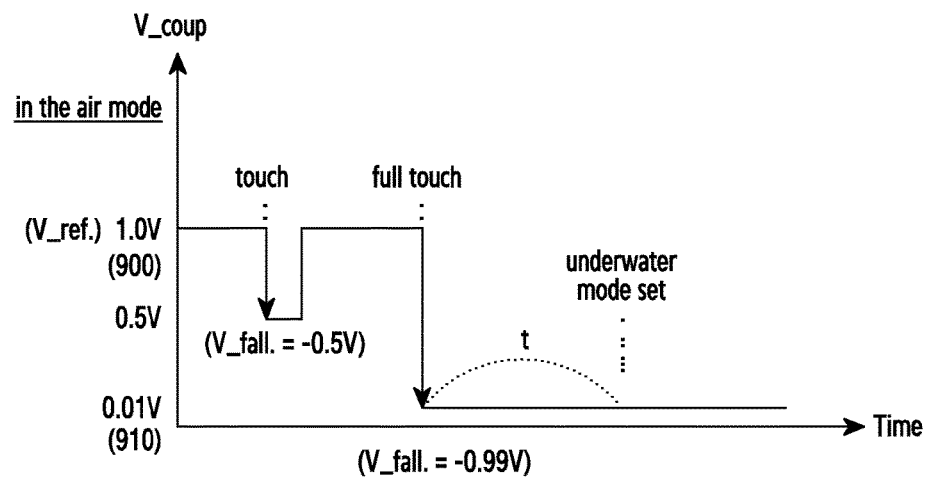
FIGS. 9A and 9B illustrates a graph regarding a falling coupling voltage and a rising coupling voltage of a touch screen panel according to various exemplary embodiments of the present disclosure.
Figure 9B:
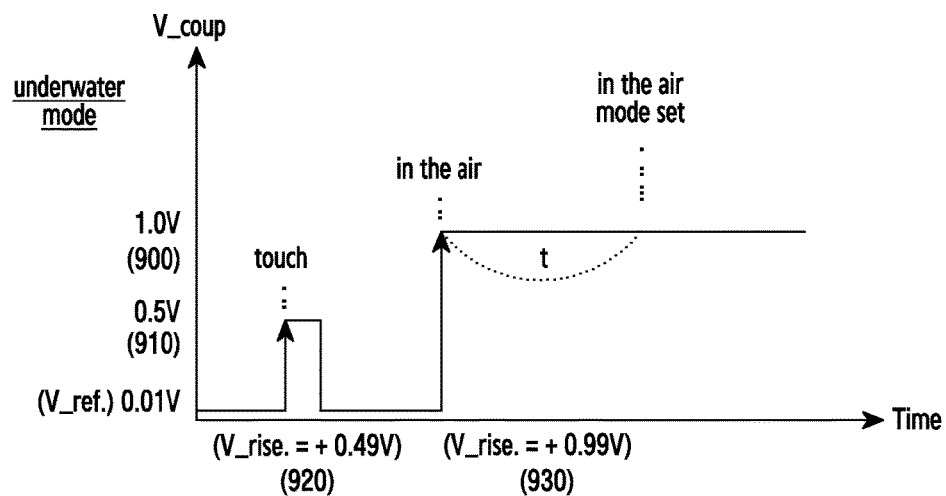

FIG. 8 illustrates a view showing an example of a touch state of the touch screen panel according to various exemplary embodiments of the present disclosure, and FIGS. 9A and 9B illustrates a graph showing an example of a change in a coupling voltage of the touch screen panel according to various exemplary embodiments of the present disclosure.

According to an exemplary embodiment of the present disclosure, the electronic device (for example: the processor 510) may determine a change (for example: an underwater state) in a surrounding environment of the electronic device and set a driving mode of the touch screen panel functionally connected with the electronic device. For example, the electronic device may switch from a mode indicating that the electronic device is in the normal air (for example: an air mode) to a mode indicating that the electronic device is under water (for example: an underwater mode).

As shown in FIG. 8, to detect whether an input (for example: a touch input or a hovering input) is inputted through the touch screen panel or not (for example: to detect rising of a coupling voltage), a reference voltage of the touch screen panel may change from a first reference voltage to a second reference voltage. For example, the first reference voltage (V_ref.) for detecting the falling coupling voltage (V_fall.), and the second reference voltage (V_ref.) for detecting the rising coupling voltage (V_rise.) may be adjusted to certain values. In addition, a designated time (t) for determining the underwater state may be adjusted to a certain time.

For example, as shown in FIG. 9A, when the electronic device is in the normal air, that is, in the air mode, the processor 510 may detect a falling coupling voltage (V_fall.) using the first reference voltage (for example: V_ref.=about 1.0V) 900. In addition, as shown in FIG. 9B, when the electronic device is in the underwater mode, the processor 510 may detect a rising coupling voltage (V_rise) using the second reference voltage (for example: V_ref.=about 0.01V) 910.

According to an exemplary embodiment of the present disclosure, as shown in FIG. 9B, the processor 510 may determine whether a user's input is inputted or not by detecting a rising coupling voltage (V_rise.) in a state in which the reference voltage is changed to the second reference voltage (for example: V_ref.=about 0.01V) 910. In this regard, the processor 510 may perform an operation corresponding to the input. For example, the processor 510 may determine whether the user touches or not by detecting the rising coupling voltage (for example: V_rise.=about +0.49V) 920, and then perform an operation corresponding to the touch.

According to an exemplary embodiment, as shown in FIG. 9B, when the absolute value of the rising coupling voltage (for example: V_rise.=about +0.99V) 930 detected in the underwater mode is the same as or substantially identical to the first reference value (for example: V_ref.=about 1.0V) designated to detect a falling coupling voltage, and is maintained on the entire area of the touch screen panel for more than a predetermined time (for example: t=2 seconds), it is determined that the electronic device is in the normal air, that is, in the air state. In this regard, when it is determined that the electronic device is in the air state, the processor 510 may restore the operation mode of the electronic device from the underwater mode to the air mode, and changes the reference voltage to the first reference voltage (for example: V_ref=1.0V) 900 to detect whether the user touches or not using a falling coupling voltage (V_fall.).

Figure 10:
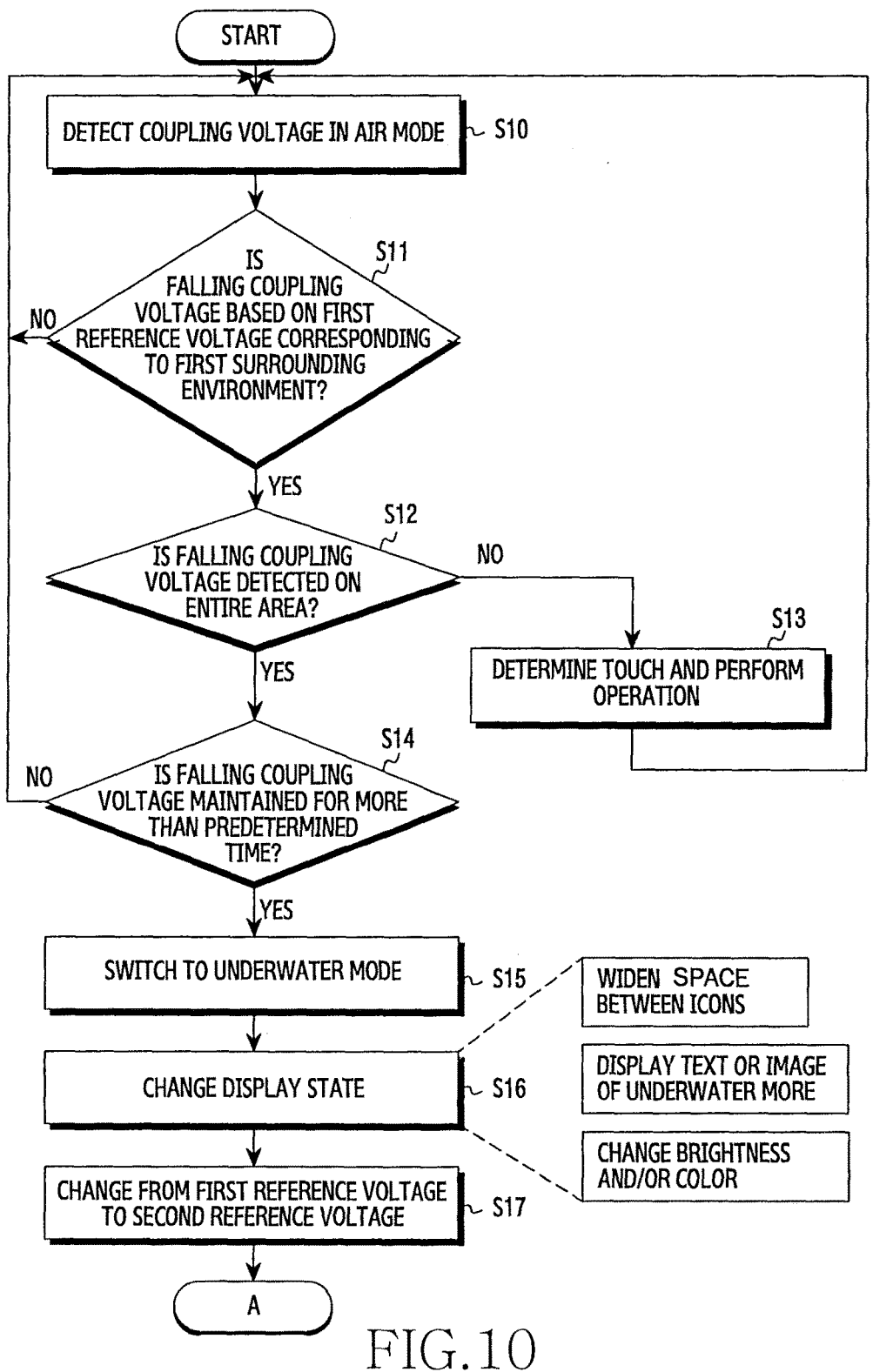
FIG. 10 illustrates a flowchart showing some operations of an operation method of an electronic device according to various exemplary embodiments of the present disclosure.
Figure 11:
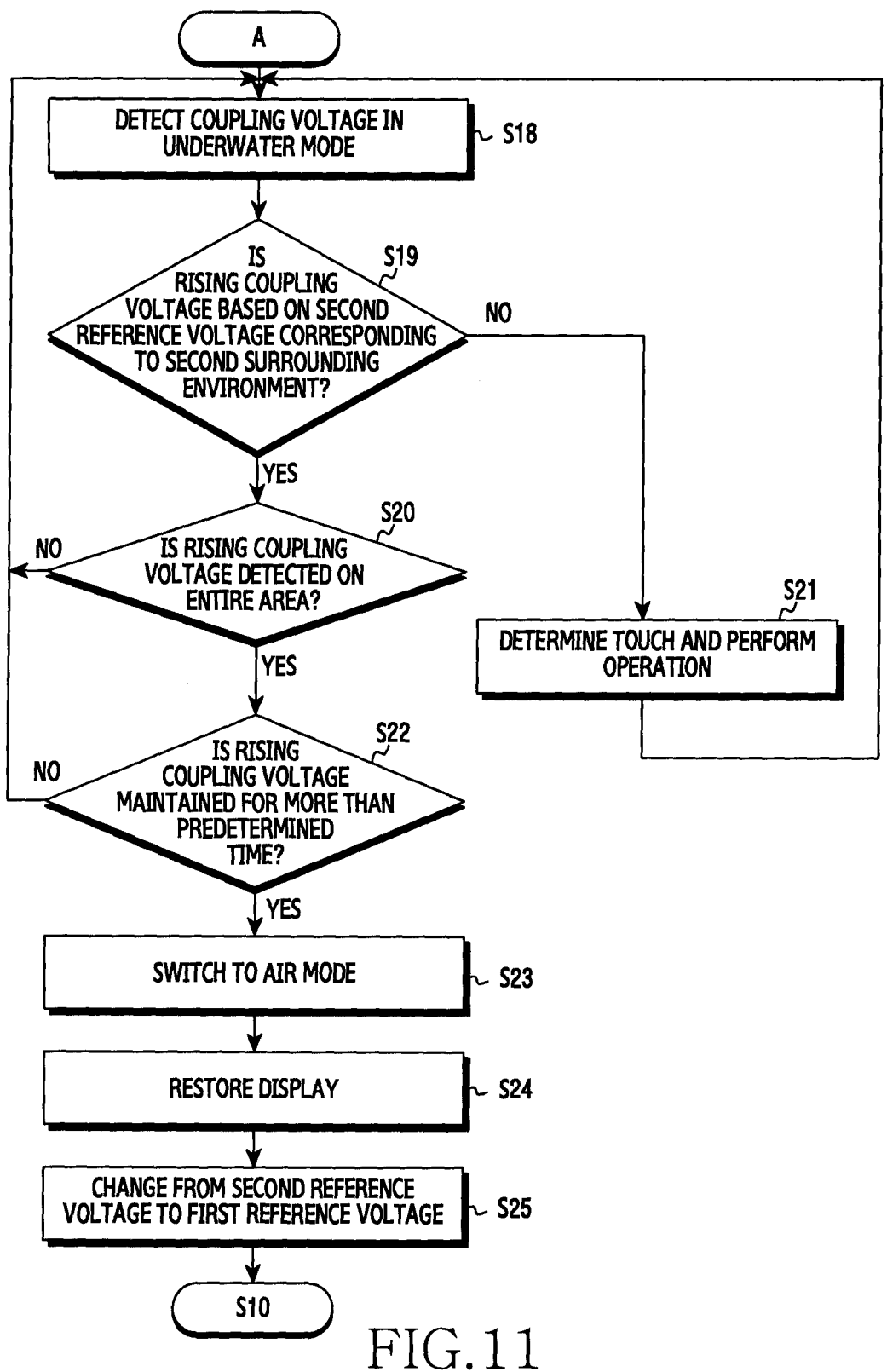
FIG. 11 illustrates a flowchart showing some operations of an operation method of an electronic device according to various exemplary embodiments of the present disclosure.

FIG. 10 illustrates a flowchart showing an operation method of the electronic device according to various exemplary embodiments of the present disclosure, and illustrates a flowchart showing some operations in the air mode, and FIG. 11 illustrates a flowchart showing an operation method of the electronic device according to various exemplary embodiments of the present disclosure, and illustrates a flowchart showing some operation in the underwater mode.

In operation S10, the processor 510 may recognize a change in a coupling voltage for detecting an input to the touch screen panel. For example, in the air mode in which the electronic device is in the normal air, the processor 510 may detect a coupling voltage (V_coup.) of the touch screen panel and determine whether a user's input (for example: a touch) is inputted or not.

In operation S11, the processor 510 may determine whether the coupling voltage falls below a designated first reference voltage (for example: V_ref.=about 1.0V) (for example: a falling coupling voltage (V_fall.)). When it is determined that the coupling voltage falls, the processor 510 may determine whether the falling coupling voltage is detected on a first area (for example: an entire area) of the touch screen panel or not in operation S12.

When the falling coupling voltage is not detected on the entire area as a result of the determining, the processor 510 may determine that the surrounding environment of the electronic device has not changed. Accordingly, the processor 510 may manage the driving mode (for example: the air mode) of the touch screen. In operation S13, the electronic device may determine the user's input (for example: a touch) in the driving mode (for example: the air mode) and perform an operation corresponding the input.

When the falling coupling voltage is detected on the entire area as a result of the determining and is maintained for more than a predetermined time (for example: t=2 seconds) in operation S14, the processor 510 may determine an underwater state in which the entire area of the touch screen panel is fully touched by water having conductivity. According to the result of the determining, the processor 510 may determine that the surrounding environment of the electronic device has changed. For example, in operation S15, the processor 510 may switch the driving mode of the touch screen from the air mode to the underwater mode. The electronic device may determine a change in the environment of the electronic device (for example: an underwater state) without using a separate location detection sensor (for example: an underwater detection sensor).

When the driving mode of the panel of the touch screen switches (for example: to the underwater mode), the processor 510 may change information (for example: screen arrangements, color, size, etc. of icons) displayed on the display functionally connected with the touch screen panel appropriately according to the driving mode of the touch screen panel (for example: the underwater mode).

When the driving mode of the touch screen panel switches to the underwater mode, the processor 510 may change the reference voltage for detecting a coupling voltage from the first reference voltage to a second reference voltage in operation S17. For example, the processor 510 may change the first reference voltage (for example: V_ref.=about 1.0V) for detecting a falling coupling voltage (V_fall.) in the air mode to the second reference voltage (for example: V_ref=about 0.01V) for detecting a rising coupling voltage (V_rise) in the underwater mode.

As shown in FIG. 11, in operation S18, the processor 510 may detect a coupling voltage (V_coup.) of the touch screen panel and determine whether a user touch is inputted or not in the underwater mode. The processor 510 may set an increase rate of the rising coupling voltage to be relatively higher than a decrease rate of the falling coupling voltage by considering that the touch sensitivity is relatively lower in the water than in the air.

In operation S19, the processor 510 detects a rising coupling voltage (V_rise.) using the second reference voltage (for example: V_ref.=about 0.01V), and, when the rising coupling voltage is detected, the processor 510 determines whether the rising coupling voltage is detected on the entire area of the touch screen panel in operation S20.

When the rising coupling voltage is not detected on the entire area as a result of the determining, the processor 510 may determine a user touch in the underwater mode and perform an operation corresponding to the touch in operation S21. Therefore, the processor 510 can perform the operation corresponding to the user's touch even in the water.

When the rising coupling voltage is detected on the entire area as a result of the determining and is maintained for more than a predetermined time (for example: t=2 seconds) in operation S22, the processor 510 may determine that the touch screen panel is operated in the normal air, and switches from the underwater mode to the air mode in operation S23.

When the underwater mode switches to the air mode, the processor 510 may restore the display state of the touch screen panel which was displayed before the mode switched to the underwater mode (for example: the display state of the air mode) in operation S24. For example, the display state of the air mode may be identified before the air mode switches to the underwater mode, and types and location information of displayed icons may be stored. Thereafter, when the underwater mode switches to the air mode, the types and location information of the icons which are store may be identified and the display state may be restored.

When the underwater mode switches to the air mode as described above, the processor 510 may change the reference voltage for detecting a coupling voltage from the second reference voltage to the first reference voltage in operation S25. For example, the processor 510 may change the reference voltage from the second reference voltage (for example: V_ref.=about 0.01V) for detecting a rising coupling voltage (V_rise.) in the underwater mode to the first reference voltage (for example: V_ref=about 1.0V) for detecting a falling coupling voltage (V_fall.) in the air mode.

Thereafter, the processor 510 may detect a coupling voltage (V_coup.) of the touch screen panel in the air mode and determine whether a user's touch is inputted or not. For example, the processor 510 automatically switches from the air mode to the underwater mode and from the underwater mode to the air mode, so that user's convenience can be enhanced.

The processor 510 may determine whether the electronic device is in the underwater state or not by detecting a falling coupling voltage as described above, and, when the electronic device is not a waterproof electronic device, may turn off power or display a message (for example, a warning message) indicating that the electronic device is not a waterproof electronic device.

The processor 510 may determine whether the surrounding environment of the touch screen panel has changed from a first surrounding environment to a second surrounding environment, and when the surrounding environment has changed to the second surrounding environment, may change the reference voltage of the touch screen panel from the first reference voltage to the second reference voltage.

Figure 12:
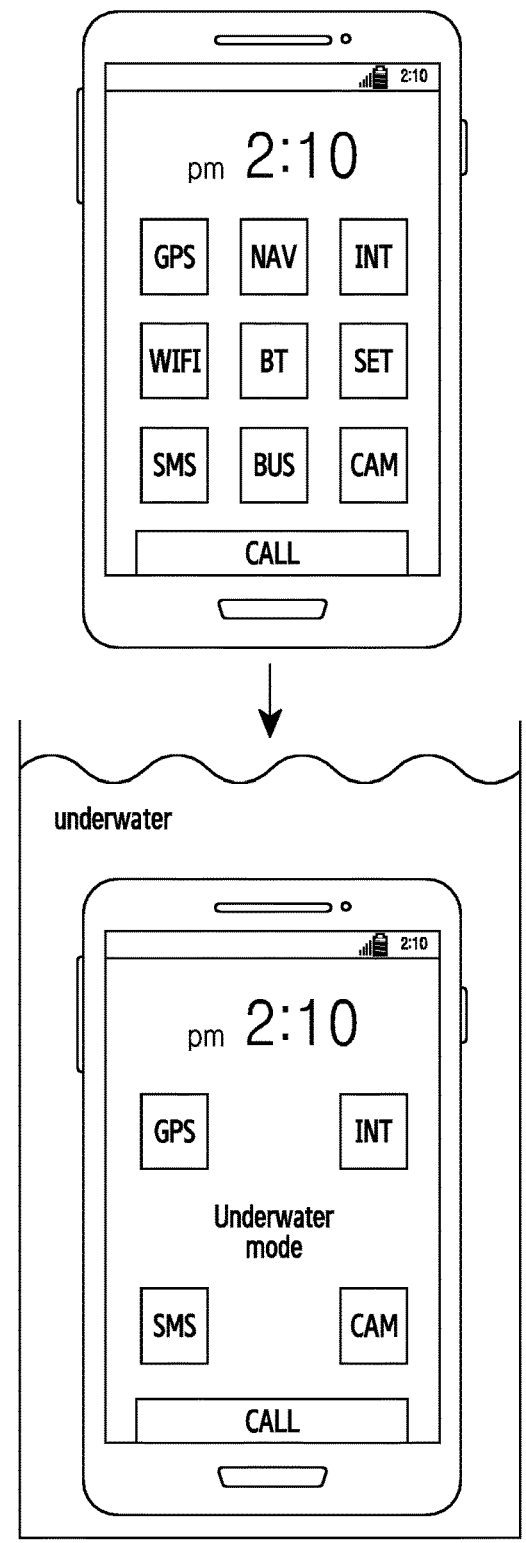
FIG. 12 illustrates a view showing a display screen in an underwater mode according to various exemplary embodiments of the present disclosure.

For example, the processor 510 may adjust a space between icons to be displayed on the touch screen panel to be wider in the underwater mode as shown in FIG. 12. Accordingly, the user can exactly select and touch the icon that the user desires even in the water.

For example, if nine icons are densely displayed in the normal air, that is, in the air mode, four icons may be selected and displayed sparsely in the underwater mode and a text or an image indicating the underwater mode may be displayed.

Figure 13:
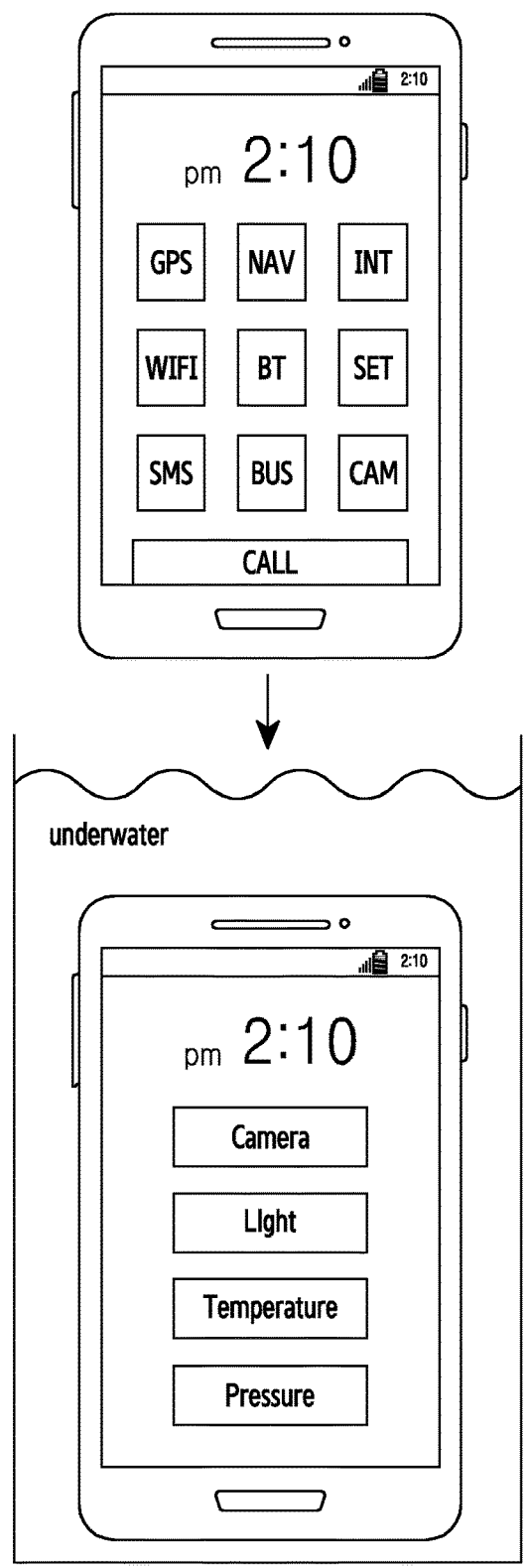
FIG. 13 illustrates a view showing a display screen in an underwater mode according to various exemplary embodiments of the present disclosure.

The processor 510 may select types of icons to be displayed on the touch screen panel in the underwater mode and display the icons. For example, as shown in FIG. 13, the processor 510 may select icons which are usable in the water regardless of a communication function, such as a camera icon, a light icon, a temperature icon, a pressure icon, etc., and display the icons with size which is good for the user to touch.

Figure 14:
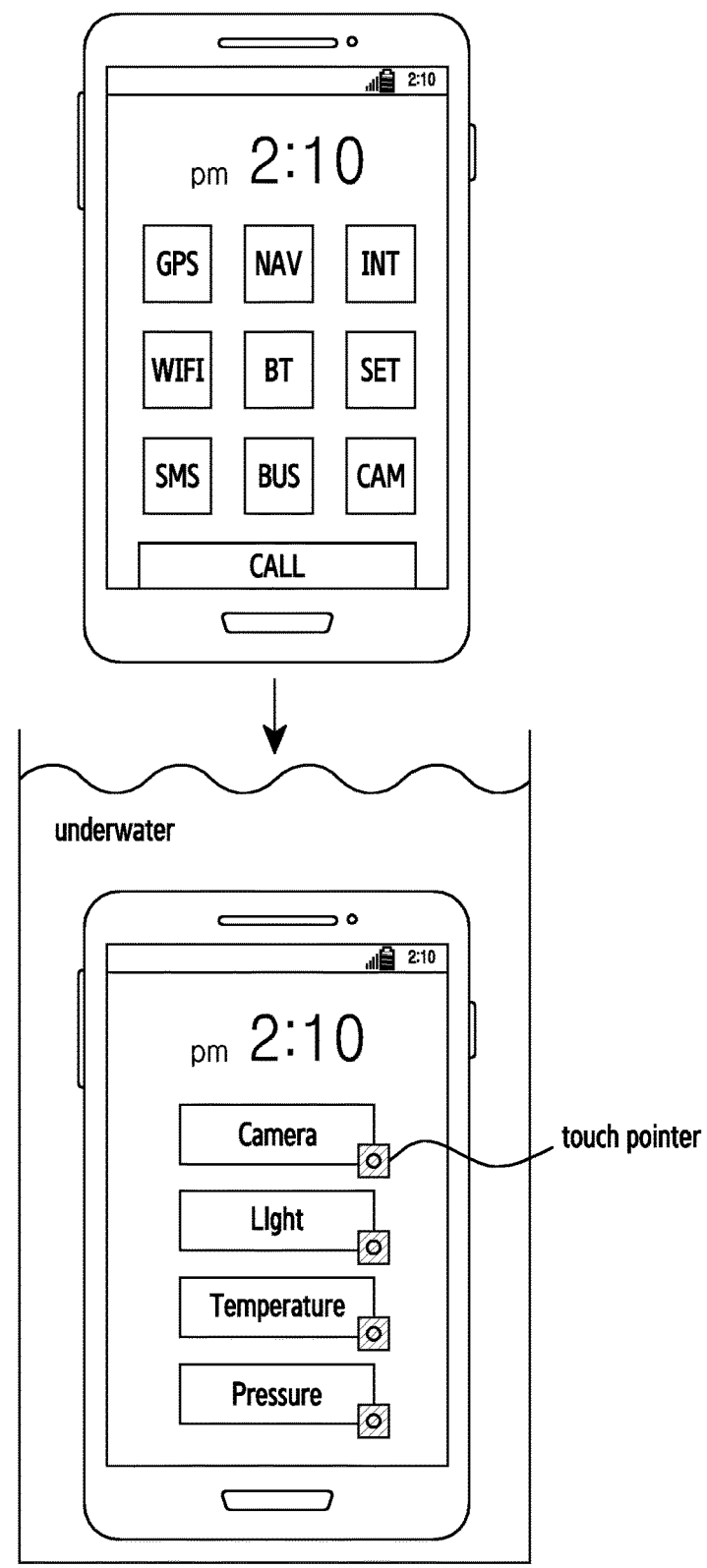
FIG. 14 illustrates a view showing a display screen in an underwater mode according to various exemplary embodiments of the present disclosure.

In the underwater mode, the processor 510 may display a touch pointer to exactly guide a touch location of the user on the touch screen panel as shown in FIG. 14, so that the user can exactly touch the icon that the user desires in the water. The processor 510 may change one or more of brightness and color of the touch screen panel in the underwater mode, so that the user can exactly identify the icon that the user desires even in the water.

The processor 510 may additionally display icons of various shapes and a variety of information which is easy for the user to use in the water on the touch screen panel, or may maintain the display state of the air mode as it is. According to an exemplary embodiment, the processor 510 may control the operation of the electronic device according to whether it is possible to recognize the surrounding environment of the electronic device. For example, when the electronic device is not waterproof, damage to the device can be prevented by shutting off power supplied to the electronic device or at least one of modules functionally connected with the electronic device.

The method and apparatus for processing an input using the touch screen according to various exemplary embodiments of the present disclosure can detect a change in the environment of the electronic device without using a separate location detection sensor, by detecting a change in the voltage for detecting a touch on the touch screen. In addition, since a user's input (for example: a touch) can be determined in an environment (for example: in the water)

other than a normal environment (for example, in the air), an operation corresponding to the user's input can be processed.

The term "module" used in the various exemplary embodiments of the present disclosure refers to a unit including one of hardware, software, and firmware, or a combination of two or more of them, for example. For example, the "module" may be used interchangeably with terms "unit," "logic," "logical block," "component" or "circuit." The "module" may be a minimum unit of an integrally configured part or a part of it. The "module" may be a minimum unit that performs one or more functions or a part of it. The "module" may be implemented mechanically or electronically. For example, the "module" according to various exemplary embodiments of the present disclosure may include at least one of an Application-Specific Integrated Circuit (ASIC) chip, Field-Programmable Gate Arrays (FPGAs), and a programmable logic device, which perform any operation that is already well known or will be developed in the future.

At least part of the apparatus (for example: modules or functions) or method (for example: operations) according to various exemplary embodiments of the present disclosure may be implemented by using instructions stored in computer-readable storage media in the form of a programming module. When the instructions are executed by one or more processors (for example: the processor 420), the one or more processors may perform a function corresponding to the instructions. The computer-readable storage media may be the memory 430, for example. At least part of the programming module may be implemented (for example: executed) by using the processor 510. At least part of the programming module may include a module, a program, a routine, sets of instructions, a process, and the like for performing one or more functions.

Examples of the computer-readable recording media include magnetic media such as hard disks, floppy disks and magnetic tapes, optical media such as a Compact Disc Read Only Memory (CD-ROM) and a Digital Versatile Disc (DVD), magneto-optical media such as floptical disks, and hardware devices such as a Read Only Memory (ROM), a Random Access Memory (RAM) and a flash memory that are especially configured to store and execute program commands (for example; the programming module). Examples of the program commands include machine language codes created by a compiler, and high-level language codes that can be executed by a computer by using an interpreter. The above-described hardware devices may be configured to operate as one or more software modules for performing operations of the present disclosure, and vice versa.

A module or programming module according to the various exemplary embodiments of the present disclosure may include one or more of the above-described elements, may omit some elements, or may further include additional elements. The operations performed by the module, the programming module, or the other elements according to the various exemplary embodiments of the present disclosure may be performed serially, in parallel, repeatedly, or heuristically. In addition, some operations may be performed in different order or may be omitted, and an additional operation may be added.

According to various exemplary embodiments, the storage medium which stores the instructions may be a computer readable storage medium which stores a program for performing a method including: determining whether a surrounding environment of a touch screen panel has changed from a first surrounding environment to a second surrounding environment or not; and, when the surrounding environment has changed to the second surrounding environment, changing a reference voltage of the touch screen panel from a first reference voltage to a second reference voltage.

The various exemplary embodiments of the present disclosure disclosed in the present specification and drawings are merely specific embodiments to easily explain the technical features and assist easy understanding, and are not intended to limit the scope of the various exemplary embodiments of the present disclosure. Therefore, the scope of the various exemplary embodiments of the present disclosure should be interpreted as including all changes or changed forms derived based on the technical idea of the various exemplary embodiments of the present disclosure, in addition to the exemplary embodiments disclosed herein.

What is claimed is:

1. An operation method of an electronic device, the operation method comprising:
   in response to detecting a change in a coupling voltage, determining whether a surrounding environment of a touch screen panel has changed from an air environment to a water environment based on an area of the coupling voltage change and a maintain time which the coupling voltage changes; and
   if the surrounding environment has changed to the water environment, changing a reference voltage of the touch screen panel from a first reference voltage corresponding to the air environment to a second reference voltage corresponding to the water environment.

2. The operation method of claim 1, wherein the determining comprises detecting a falling coupling voltage based on the first reference voltage corresponding to the air environment, and determining whether the air environment has changed to the water environment based on an area of the falling coupling voltage and a maintain time which the falling coupling voltage.

3. The operation method of claim 2, wherein the determining comprises, if the falling coupling voltage is continuously detected on the area of the touch screen panel greater than or equal to a predetermined area during a predetermined time, determining that the air environment has changed to the water environment.

4. The operation method of claim 1, further comprising, if the surrounding environment has changed to the water environment, widening a space between icons to be displayed on the touch screen panel.

5. The operation method of claim 4, wherein the icons includes at least one of a camera icon, a light icon, a temperature icon, a pressure icon.

6. The operation method of claim 1, further comprising, if the surrounding environment has changed to the water environment, displaying one or more of a text and an image for informing of the water environment on the touch screen panel, or changing one or more of brightness and color of the touch screen panel.

7. The operation method of claim 1, further comprising detecting a rising coupling voltage based on the second reference voltage corresponding to the water environment, and determining whether the water environment has changed to the air environment based on an area of the rising coupling voltage and a maintain time which the rising coupling voltage.

8. The operation method of claim 7, wherein further comprising:

if the rising coupling voltage is continuously detected on the area of the touch screen panel greater than or equal to a predetermined area during a predetermined time, determining that the water environment has changed to the air environment.

9. An electronic device comprising:
a touch screen panel; and
a processor configured to control the touch screen panel, wherein the processor is configured to:
in response to detecting a change in a coupling voltage, determine whether a surrounding environment of the touch screen panel has changed from an air environment to a water environment based on an area of the coupling voltage change and a maintain time which the coupling voltage changes, and,
if the surrounding environment has changed to the water environment, change a reference voltage of the touch screen panel from a first reference voltage corresponding to the air environment to a second reference voltage corresponding to the water environment.

10. The electronic device of claim 9, wherein the processor is further configured to detect a falling coupling voltage based on the first reference voltage corresponding to the air environment, and determine whether the air environment has changed to the water environment based on an area of the falling coupling voltage and a maintain time which the falling coupling voltage.

11. The electronic device of claim 10, wherein the processor is further configured to, if the falling coupling voltage is continuously detected on the area of the touch screen panel greater than or equal to a predetermined area during a predetermined time, determine that the air environment has changed to the water environment.

12. The electronic device of claim 9, wherein, if the surrounding environment has changed to the water environment, the processor is configured to widen a space between icons to be displayed on the touch screen panel.

13. The electronic device of claim 12, wherein the icons includes at least one of a camera icon, a light icon, a temperature icon, a pressure icon.

14. The electronic device of claim 9, wherein, if the surrounding environment has changed to the water environment, the processor is configured to control to the touch screen panel to display one or more of a text and an image for informing of the water environment, or change one or more of brightness and color of the touch screen panel.

15. The electronic device of claim 9, wherein the processor is further configured to detect a rising coupling voltage based on the second reference voltage corresponding to the water environment, and, determining whether the water environment has changed to the air environment based on an area of the rising coupling voltage and a maintain time which the rising coupling voltage.

16. The electronic device of claim 15, wherein the processor is further configured to, if the rising coupling voltage is continuously detected on the area of the touch screen panel greater than or equal to a predetermined area during a predetermined time, determining that the water environment has changed to the air environment.

17. A non-transitory computer readable storage medium which stores a program for performing a method comprising:
in response to detecting a change in a coupling voltage, determining whether a surrounding environment of a touch screen panel has changed from an air environment to a water environment based on an area of the coupling voltage change and a maintain time which the coupling voltage changes; and
if the surrounding environment has changed to the water environment, changing a reference voltage of the touch screen panel from a first reference voltage corresponding to the air environment to a second reference voltage corresponding to the water environment.

* * * * *